US011384850B2

(12) United States Patent
Gerger et al.

(10) Patent No.: US 11,384,850 B2
(45) Date of Patent: Jul. 12, 2022

(54) HYDRAULIC CONTROL VALVES FOR RAM AIR TURBINE STOW ACTUATORS

(71) Applicant: Hamilton Sundstrand Corporation, Charlotte, NC (US)

(72) Inventors: Stuart T. Gerger, Madison, WI (US); Stephen Michael Bortoli, Roscoe, IL (US); Timothy Scott Konicek, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 126 days.

(21) Appl. No.: 16/791,600

(22) Filed: Feb. 14, 2020

(65) Prior Publication Data

US 2021/0254639 A1 Aug. 19, 2021

(51) Int. Cl.
| F16K 11/07 | (2006.01) |
| F02K 7/10 | (2006.01) |
| F15B 15/02 | (2006.01) |
| F15B 15/20 | (2006.01) |
| F16K 3/314 | (2006.01) |
| F16K 3/24 | (2006.01) |

(52) U.S. Cl.
CPC ............ *F16K 11/0712* (2013.01); *F02K 7/10* (2013.01); *F15B 15/02* (2013.01); *F15B 15/20* (2013.01); *F16K 3/24* (2013.01); *F16K 3/314* (2013.01); *F16K 11/07* (2013.01); *F05D 2220/34* (2013.01); *F05D 2240/90* (2013.01)

(58) Field of Classification Search
CPC .. F15B 15/20; F16K 11/0712; F16K 11/0716; F16K 31/0613
See application file for complete search history.

(56) References Cited

U.S. PATENT DOCUMENTS

| 4,676,458 | A | 6/1987 | Cohen | |
| 9,505,288 | B2 * | 11/2016 | Bauer | B60G 17/08 |
| 9,976,579 | B2 * | 5/2018 | Bortoli | B64D 41/007 |
| 10,106,275 | B2 * | 10/2018 | Sasscer | F15B 15/14 |
| 2018/0187787 | A1 | 7/2018 | Asakura et al. | |
| 2019/0056036 | A1 * | 2/2019 | Lauer | F15B 11/04 |

OTHER PUBLICATIONS

European Search Report for Application No. 21153187.6, dated Jul. 7, 2021, 41 pages.

* cited by examiner

*Primary Examiner* — Thomas E Lazo
(74) *Attorney, Agent, or Firm* — Cantor Colburn LLP

(57) ABSTRACT

A hydraulic control valve includes a sleeve with actuator and biasing member ends and a spool with first and second lands. The sleeve defines a bore extending along a spool movement axis, a source port proximate the stow solenoid end and in communication with the bore, and a supply port between the source port and the biasing end. The spool is slidably disposed within the bore, is movable along the spool movement axis between first and second positions, fluidly separates the source port from the supply port in the first position, and allows the bore to fluidly couple the source port with the supply port in the second position. The first land extends circumferentially about the spool and has a first land length, the second land extending circumferentially about the spool and has a second land length, and the first land length is larger than the second land length.

20 Claims, 6 Drawing Sheets

HYDRAULIC CONTROL VALVES FOR RAM AIR TURBINE STOW ACTUATORS

BACKGROUND

The present disclosure generally relates to hydraulic control valves, and more particularly to spools for hydraulic control valves such as in stow actuators for ram air turbines on aircraft.

Ram air turbines are provided on aircraft to provide backup power to the aircraft. When backup power is not required the ram air turbine typically remains dormant in stowed position. When backup power is required the ram air turbine is typically moved to a deployed position wherein the ram air turbine generates electric and/or hydraulic power. When backup power is no longer required the ram air turbine is generally returned to the stowed position, typically by operation of a hydraulic control valve. Such hydraulic control valves typically communicate with a high-pressure fluid source and, when actuated, port high-pressure hydraulic fluid such that an actuator moves the ram air turbine to the stowed position.

One challenge to such hydraulic control valves is limiting high-pressure fluid leakage. For example, leakage paths can exist within the valve between the high-pressure fluid source and the aircraft return line while the ram air turbine is dormant, wasting pressurized fluid and limiting efficiency of the fluid source providing the pressurized fluid. Such internal leakage paths can generally be limited by controlling tolerances between the valve spool and valve. Leakage paths can also emerge during opening of the valve, such as during transient intervals when the high-pressure fluid is in fluid communication with both the actuator supply cavity, potentially slowing (or stopping entirely) the stow of the ram air turbine.

Such systems and methods have generally been satisfactory for their intended purpose. However, there remains a need in the art for improved hydraulic control valves, stow actuator arrangements for ram air turbines, and methods of controlling fluid flow in hydraulic control valves.

BRIEF DESCRIPTION

A hydraulic control valve including a sleeve and a spool is provided. The sleeve has a stow solenoid end, a biasing member end, and a bore defining a spool movement axis. The sleeve defines a source port proximate the stow solenoid end of the sleeve and a supply port between the source port and the biasing end of the sleeve in communication with the bore. The spool has a first land and second land, both slidably disposed within the bore, and is movable along the spool movement axis between a first position and a second position. In the first position the spool fluidly separates the source port from the supply port. In the second position the bore fluidly couples the source port with the supply port in the second position The first land extends circumferentially about the spool and has a first land length, the second land extending circumferentially about the spool and has a second land length, and the first land length is larger than the second land length.

In addition to one or more of the features described above, or as an alternative, further examples of the hydraulic control valve may include that the spool has an actuated end land portion axially separated from an intermediate land portion and a biasing end land portion, and that the first land and the second land are arranged on the actuated end land portion of the spool.

In addition to one or more of the features described above, or as an alternative, further examples of the hydraulic control valve may include that the first land axially separates the second land from the stow solenoid end of the sleeve.

In addition to one or more of the features described above, or as an alternative, further examples of the hydraulic control valve may include that the actuated end land portion defines two or more stow solenoid end balancing grooves, and that the two or more stow solenoid end balancing grooves axially separate the first land from the second land.

In addition to one or more of the features described above, or as an alternative, further examples of the hydraulic control valve may include that the first land and the second land fluidly separate the stow solenoid end of the sleeve from the source port in the first position, and that the first land and the second land fluidly separate the stow solenoid end of the sleeve from the supply port in the first position and the second position.

In addition to one or more of the features described above, or as an alternative, further examples of the hydraulic control valve may include that the actuated end land portion defines two or more stow solenoid end balancing grooves, that the intermediate land portion defines two or more intermediate balancing grooves, and that the two or more intermediate balancing grooves are smaller than the two or more stow solenoid end balancing grooves.

In addition to one or more of the features described above, or as an alternative, further examples of the hydraulic control valve may include that the spool has an intermediate land portion axially separating an actuated end land portion from a biasing end land portion, and that the first land and the second land are arranged on the intermediate land portion of the spool.

In addition to one or more of the features described above, or as an alternative, further examples of the hydraulic control valve may include that the first land is arranged axially between the second land and the stow solenoid end of the sleeve.

In addition to one or more of the features described above, or as an alternative, further examples of the hydraulic control valve may include that the intermediate land portion of the spool defines two or more intermediate balancing grooves, and that at least one of the two or more intermediate balancing grooves axially separates the first land from the second land.

In addition to one or more of the features described above, or as an alternative, further examples of the hydraulic control valve may include that the sleeve defines radially therethrough a return port in fluid communication with the bore, that the first land fluidly separates the return port from the source port in the first position, and that the second land fluidly separates the return port from the source port in the second position.

In addition to one or more of the features described above, or as an alternative, further examples of the hydraulic control valve may include that the intermediate land portion defines two or more intermediate balancing grooves, that the actuated end land portion defines two or more stow solenoid end balancing grooves, and that the two or more intermediate balancing grooves is smaller than the plurality of stow solenoid end balancing grooves.

In addition to one or more of the features described above, or as an alternative, further examples of the hydraulic control valve may include that the spool has a biasing member seat arranged axially between the second land and the biasing member end of the spool, and that the hydraulic control valve further includes a biasing member arranged between the biasing member seat and the biasing member end of the sleeve.

In addition to one or more of the features described above, or as an alternative, further examples of the hydraulic control valve may include that the sleeve defines a stow solenoid port on the actuated end of the sleeve, that the stow solenoid port in fluid communication with the first land in the first position, and that the stow solenoid port in fluid communication with the first land in the second position of the spool.

In addition to one or more of the features described above, or as an alternative, further examples of the hydraulic control valve may include that the sleeve defines a return port extending radially through the sleeve, and that the supply port is fluidly separated from both the source port and at a coincident closure position along a stroke of the spool between the first position and the second position.

In addition to one or more of the features described above, or as an alternative, further examples of the hydraulic control valve may include a source orifice body fluidly coupled to the source port, a source union fluidly coupled to the source orifice body, and a source fitting fluidly coupled to the source union and arranged to communicate high-pressure fluid from a high-pressure fluid source to the source union.

In addition to one or more of the features described above, or as an alternative, further examples of the hydraulic control valve may include that the sleeve defines a stow solenoid port axially separated from the supply port by the source port, and that the hydraulic control valve further includes a stow solenoid fluidly coupled to the source union and a return union fluidly coupled to the stow solenoid and the sleeve.

In addition to one or more of the features described above, or as an alternative, further examples of the hydraulic control valve may include a pressure switch fluidly coupled to the supply port of the sleeve and an actuator for a ram air turbine operatively associated with the pressure switch via position of the spool within the hydraulic control valve.

A stow actuator arrangement for a ram air turbine is also provided. The stow actuator arrangement includes a hydraulic control valve as described above. The spool has an intermediate land portion axially separating a biasing end land portion from an actuated end land portion, the first land being a stow solenoid end portion first land and the second land being a stow solenoid end portion second land. The intermediate land portion has an intermediate portion first land and an intermediate portion second land, the intermediate portion first land having an intermediate portion first land length, the intermediate portion second land having an intermediate portion second land length, and the intermediate portion first land length being larger than the intermediate portion second land length.

In addition to one or more of the features described above, or as an alternative, further examples of the stow actuator arrangement may include that the stow solenoid end portion first land is axially separated from the intermediate portion first land by the stow solenoid end portion second land.

In addition to one or more of the features described above, or as an alternative, further examples of the stow actuator arrangement may include a high-pressure fluid source fluidly coupled to the source port of the sleeve; a ram air turbine operatively associated with a pressure switch via position of the spool within the hydraulic control valve, the pressure switch fluidly coupled to the supply port of the sleeve, the ram air turbine having a stowed position and a deployed position; and a stow solenoid fluidly coupled to the source port of the sleeve and operative to move the ram air turbine from the deployed position to the stowed position.

Technical effects of the present disclosure include hydraulic control valves having limited (or substantially no) high-pressure fluid leakage while the ram air turbine is dormant. Technical effects of the present disclosure also include coincident closure of the connection between the actuator supply and return cavities as the actuator supply cavity comes into fluid communication with the high-pressure fluid source, limiting (or eliminating) pressurization of the actuator return cavity during actuation and/or probability of fail-to-stow events. Further technical effects of the present disclosure include hydraulic control valves that are simple, easy to manufacture, are tolerant to manufacturing variation, and/or more readily pass acceptance testing without requiring rework.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
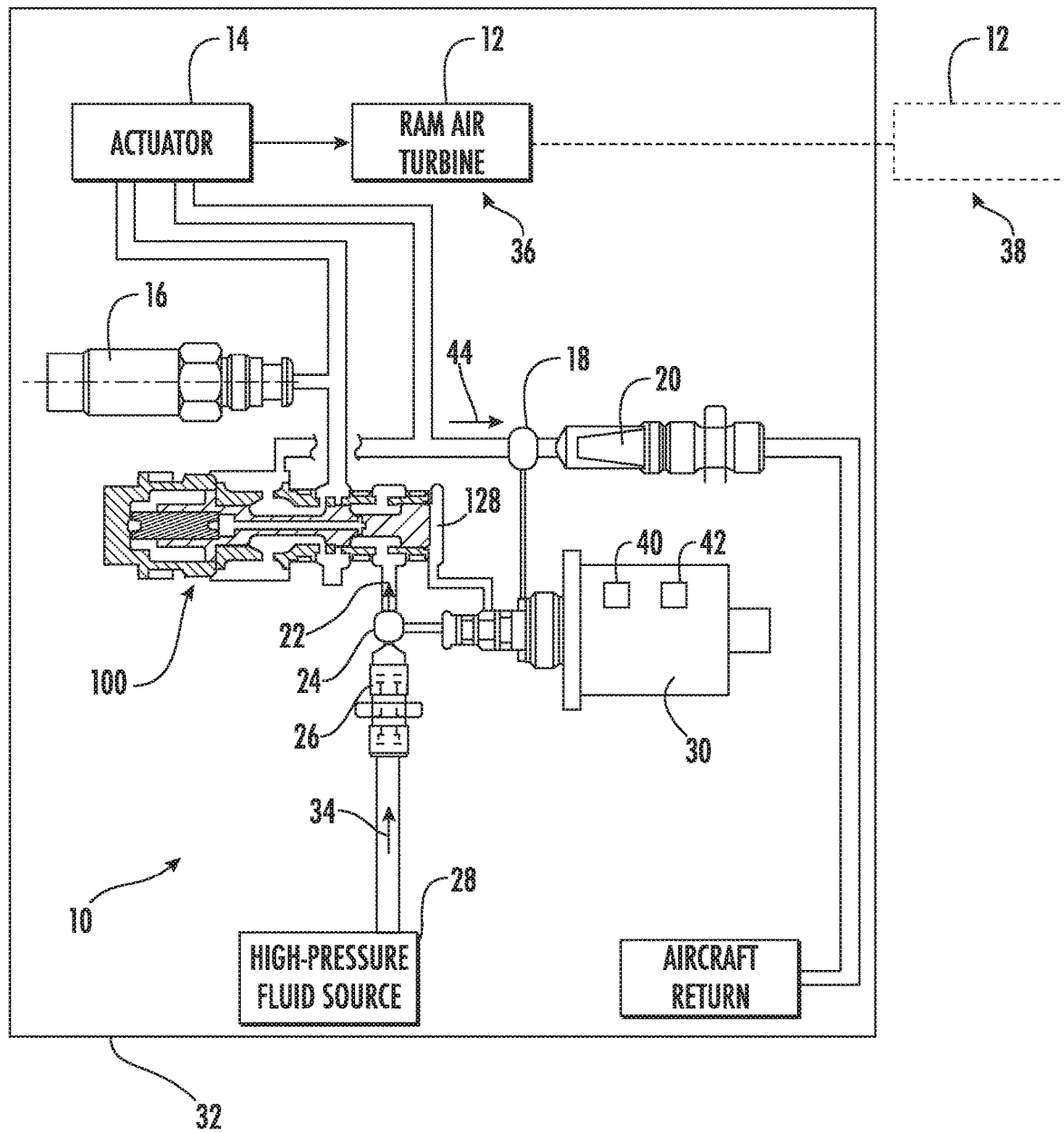
FIG. 1 is a schematic view of a stow actuator arrangement with a hydraulic control valve constructed in accordance with the present disclosure, showing a stow actuator arrangement moving a ram air turbine between a deployed position and a stowed position.

Reference will now be made to the drawings wherein like reference numerals identify similar structural features or aspects of the subject disclosure. For purposes of explanation and illustration, and not limitation, a partial view of an example of a hydraulic control valve in accordance with the disclosure is shown in FIG. 1 and is designated generally by reference character 100. Other embodiments of hydraulic control valves, stow actuator arrangements for ram air turbines, and methods of controlling fluid flow through hydraulic control valves are provided in FIGS. 2-8, as will be described. The systems and methods described herein can be used for porting fluid in hydraulic control valves, such as in stow actuator arrangements for ram air turbines in aircraft, though the present disclosure is not limited to hydraulically controlled stow actuators or to ram air turbines in aircraft generally.

Referring to FIG. 1, a stow actuator arrangement 10 for a ram air turbine 12 is shown. The stow actuator arrangement 10 includes the hydraulic control valve 100, an actuator 14, and a pressure switch 16. The stow actuator arrangement 10 also includes a return union 18, a return fitting 20, and a source orifice body 22. The stow actuator arrangement 10 further includes a source union 24, a source fitting 26, a high-pressure fluid source 28, and a stow solenoid 30. In the illustrated example the stow actuator arrangement 10 is carried by an aircraft 32 for returning the ram air turbine 12 to a stowed position 36 from a deployed position 38. Although shown and described herein the context of an aircraft it is to be understood and appreciated that hydraulically actuated devices employed in other applications can also benefit from the present disclosure, such as in terrestrial and marine vehicles.

The high-pressure fluid source 28 is arranged to provide a high-pressure fluid 34 and is fluidly coupled to the source fitting 26. The source fitting 26 fluidly couples the high-pressure fluid source 28 to the source union 24. The source union 24 fluidly couples the source fitting 26 to the source orifice body 22 and the stow solenoid 30. The source orifice body 22 fluidly couples the source union 24 to the hydraulic control valve 100. In certain examples the high-pressure fluid 34 is present at the hydraulic control valve 100 at all times irrespective of the state of the ram air turbine 12, e.g., when the ram air turbine 12 is in the stowed position 36, the deployed position 38, and while moving to the stowed position 36 from the deployed position 38.

The source union 24 is fluidly coupled to the stow solenoid 30. More specifically, the source union 24 also fluidly couples the source fitting 26 to the stow solenoid 30. The stow solenoid 30 in turn selectively fluidly couples the source union 24 to a stow solenoid port 128 of the hydraulic control valve 100 and the return union 18, and further has a de-energized state 40 and an energized state 42. In the de-energized state 40 the stow solenoid 30 does not fluidly couple the source union 24 to the stow solenoid port 128 of the hydraulic control valve 100. In the energized state 42 the stow solenoid 30 fluidly couples the source union 24 to the stow solenoid port 128 of the hydraulic control valve 100.

The ram air turbine 12 is operatively associated with the actuator 14 for movement from a deployed position 38 to a stowed position 36. The actuator 14 is in turn fluidly coupled to the hydraulic control valve 100 to selectively receive therethrough the high-pressure fluid 34 for operating the actuator 14, and therethrough moving the ram air turbine 12 from deployed position 38 to the stowed position 36. In the energized state 42, the stow solenoid 30 fluidly couples the source union 24 to the stow solenoid port 128, translating the spool 104 (shown in FIG. 2) within a sleeve 102 (shown in FIG. 2) from a first position 162 (shown in FIG. 5) to a second position 164 (shown in FIG. 5) to allow the source union 24 to be fluidly coupled to the supply port 124. In turn, a flow of high-pressure fluid 34 flows through the supply port 124 and causes the ram air turbine 12 to move from the deployed position 38 to the stowed position 36. When the ram air turbine 12 is moved from the deployed position 38 to the stowed position 36, return fluid flow 44 passes through the return fitting 20 which is itself fluidly coupled to the aircraft return. In certain examples the ram air turbine 12 is as described in U.S. Pat. No. 4,676,458, issued on Jun. 30, 1987, the contents of which are incorporated herein by reference in their entirety.

Figure 2:
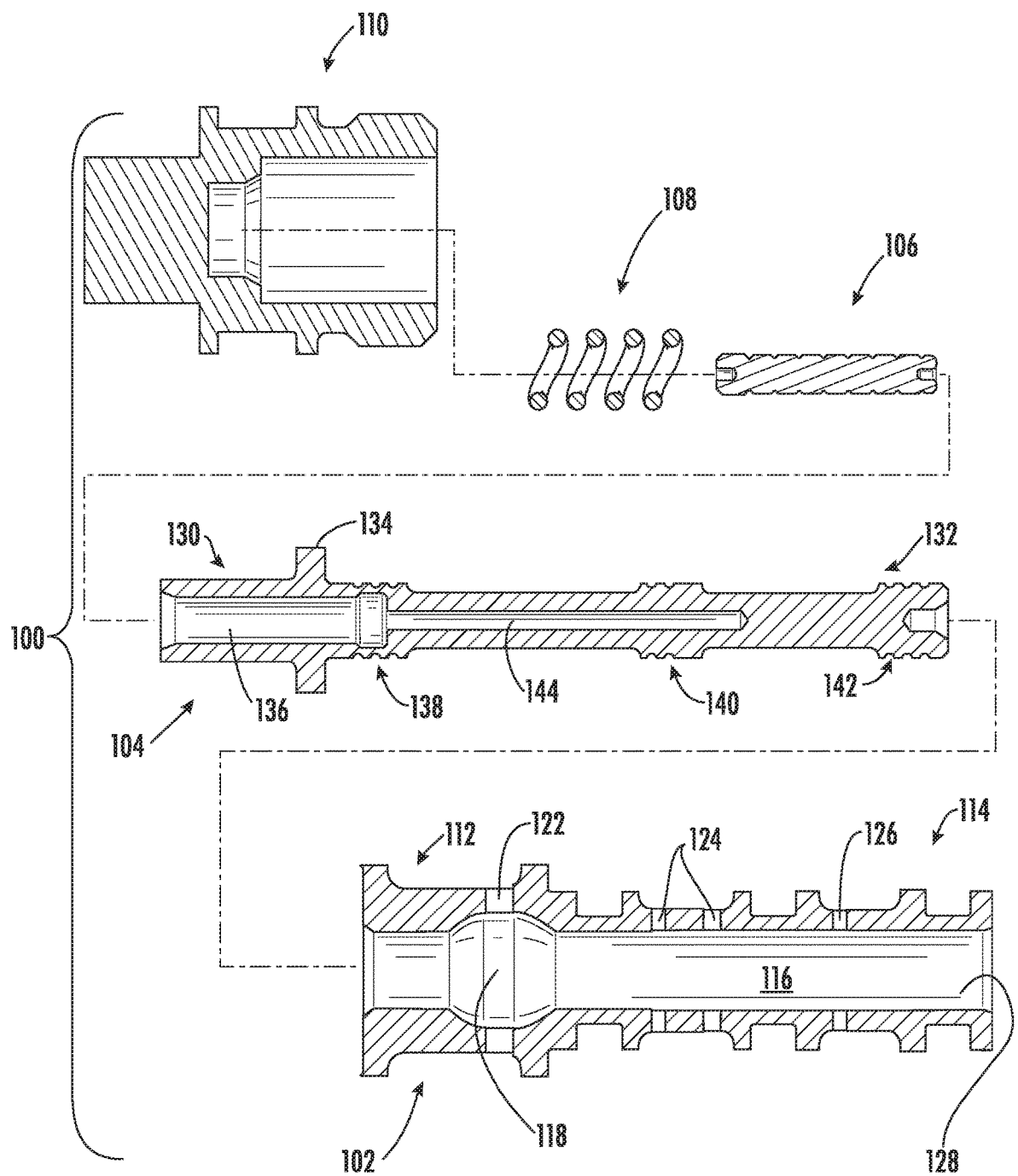
FIG. 2 is an exploded view of the of the hydraulic control valve of FIG. 1, showing ports defined by a sleeve body and land portions arranged along a spool of the hydraulic control valve.

With reference to FIG. 2, the hydraulic control valve 100 is shown. The hydraulic control valve 100 includes the sleeve 102, the spool 104, and a spool piston 106. The hydraulic control valve 100 also includes a biasing member 108 and an end cap 110.

The sleeve 102 has a bore 116 and extends between a biasing member end 112 and a stow solenoid end 114. The bore 116 is bounded by an inner surface 118 of the sleeve 102 and defines a spool movement axis 120 (shown in FIG. 4). The bore 116 is in fluid communication with the stow actuator arrangement 10 (shown in FIG. 1) through a return port 122, a supply port 124, a source port 126, and a stow solenoid port 128. The return port 122 extends radially through the sleeve 102 and is axially adjacent to the biasing member end 112 of the sleeve 102. The stow solenoid port 128 extends axially through a small portion of the stow solenoid end 114 of the sleeve 102. The source port 126 extends radially through the sleeve 102 and is defined by the sleeve 102 axially between the supply port 124 and the stow solenoid port 128. The supply port 124 extends radially through the sleeve 102 and is defined by the sleeve 102 axially between the source port 126 and the return port 122.

The source port 126 is proximate the stow solenoid end 114 of the sleeve 102 and is fluidly coupled to the high-pressure fluid source 28 (shown in FIG. 1), is continuously exposed to high-pressure fluid, and receives therefrom the high-pressure fluid 34 (shown in FIG. 3) during stow of the ram air turbine 12 (shown in FIG. 1). The stow solenoid port 128 is fluidly coupled to the stow solenoid 30 (shown in FIG. 1) to selectively receive therefrom a portion of the high-pressure fluid 34 according to state of the stow solenoid 30. The return port 122 is fluidly coupled to the return fitting 20 (shown in FIG. 1) to communicate thereto the return fluid flow 44 (shown in FIG. 1) when moving the ram air turbine 12 (shown in FIG. 1) from the deployed position 38 (shown in FIG. 1) to the stowed position 36 (shown in FIG. 1), the return fluid flow 44 being relatively low-pressure. The source port 126 is fluidly coupled to the supply port 124 according to the position of the spool 104 within the sleeve 102 to communicate thereto a portion of the high-pressure fluid 34. As will be appreciated by those of skill in the art in view of the present disclosure, communication of the portion of the high-pressure fluid 34 to the supply port 124 causes the actuator 14 (shown in FIG. 1) to move the ram air turbine 12 (shown in FIG. 1) from the deployed position 38 (shown in FIG. 1) to the stowed position 36 (shown in FIG. 1).

The spool 104 has a biased end 130 and an actuated end 132. The biased end 130 has a biasing member seat 134 and defines a guide member slot 136. A biasing end land portion 138, an intermediate land portion 140, and an actuated end land portion 142 are arranged axially between the biased end 130 and the actuated end 132 of the spool 104. The spool 104 further defines a fluid channel 144 within its interior that is in communication with the guide member slot 136 and a radially extending orifice 146 (shown in FIG. 3). The radially extending orifice 146 allows the fluid channel 144 to be fluidly coupled to the source port 126 of the sleeve 102, which in turn is fluidly coupled to the high-pressure fluid source 28. The high-pressure fluid within the fluid channel 144 reduces the force needed to move the spool 104 from a first position 162 (shown in FIG. 5) to a second position 164 (shown in FIG. 5), effectively reducing the required size and strength of the biasing member 108 and in turn reducing the overall size of the hydraulic control valve 100. The biasing member seat 134 is arranged to seat thereon the biasing member 108, which can be a spring.

Figure 3:
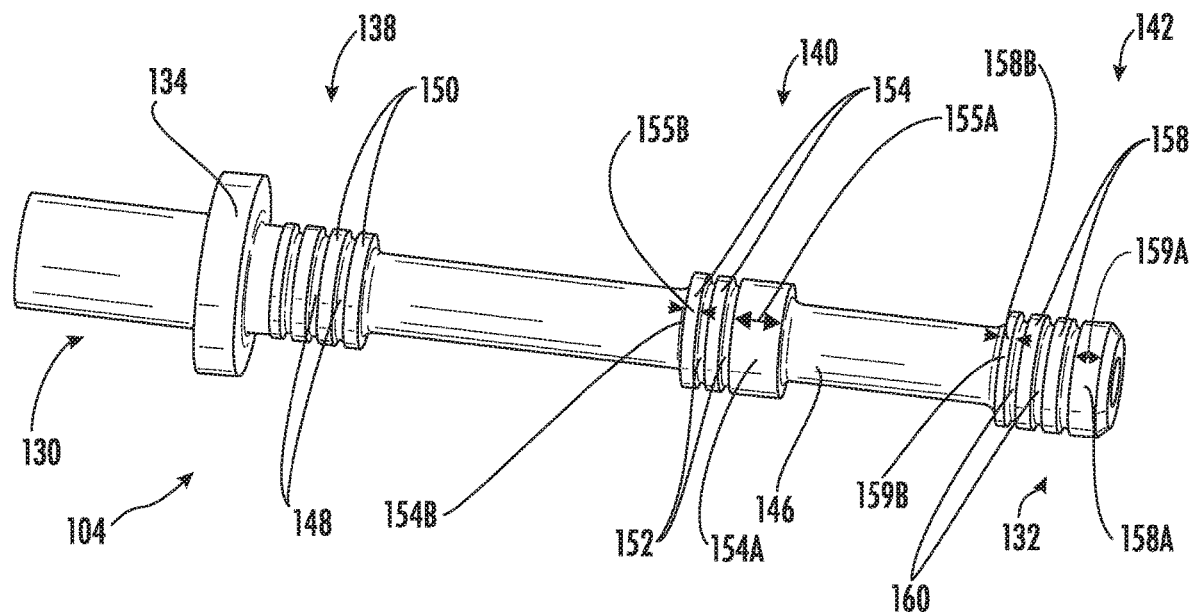
FIG. 3 is a perspective view of the spool of the hydraulic control valve of FIG. 1 according to an example, showing the arrangement of elongated lands at an intermediate land portion and an end land portion of the spool to limit potential leakage when the spool is at the first position.

With reference to FIG. 3, it is contemplated each land portion of the spool 104 has at least a first land with a first land length and a second land with a second land length. In this respect the biasing end land portion 138 defines therein a plurality of biasing end balancing grooves 148. Each of the plurality of biasing end balancing grooves 148 extends circumferentially about the spool 104 and in turn axially separates axially adjacent pairs of biasing end lands 150, which are arranged along the biasing end land portion 138. The plurality of biasing end lands 150 extend circumferentially about the spool 104 and are arranged to slidably engage the inner surface 118 of the sleeve 102 to provide fluid-tight sealing (and thereby fluid separation) between the return port 122 and a portion of the bore 116 within the biasing member end 112 of the sleeve 102.

The intermediate land portion 140 is arranged axially between the biasing end land portion 138 and the actuated end land portion 142 and defines therein a plurality of intermediate balancing grooves 152. Each of the plurality of intermediate balancing grooves 152 extends circumferentially about the spool 104 and in turn axially separates adjacent pairs of intermediate portion lands 154, which are arranged along the intermediate land portion 140. The intermediate portion lands 154 extend circumferentially about the spool 104 and are arranged to slidably engage the inner surface 118 of the sleeve 102 to provide fluid-tight sealing (and thereby fluid separation) between the supply port 124 and the return port 122 or between the supply port 124 and the source port 126 according to the position of the spool 104 within the sleeve 102.

In the illustrated example the intermediate land portion 140 defines fewer intermediate balancing grooves 152 than the biasing end land portion 138 and the actuated end land portion 142. Specifically, the plurality of intermediate balancing grooves 152 is smaller than the plurality of stow solenoid end balancing grooves 160 and/or the plurality of biasing end balancing grooves 148. This allows the contact area of the intermediate land portion 140 to be relatively long, reducing unwanted leakage from high pressure areas to low pressure areas within the sleeve 102.

The actuated end land portion 142 is arranged along the spool 104 on a side of the intermediate land portion 140 axially opposite the biasing end land portion 138 and defines therein a plurality of stow solenoid end balancing grooves 160. Each of the plurality of stow solenoid end balancing grooves 160 extends circumferentially about the spool 104 and in turn axially separates adjacent pairs of stow solenoid end portion lands 158 arranged along the actuated end land portion 142. The stow solenoid end portion lands 158 extend circumferentially about the spool 104 and are arranged to slidably engage the inner surface 118 of the sleeve 102 to provide fluid separation (e.g., fluid-tight sealing) between the stow solenoid port 128 and the source port 126.

With continuing reference to FIG. 2, the spool piston 106 is slidably received within the guide member slot 136 of the spool 104. The biasing member 108 is seated about the biased end 130 of the spool 104, in axial abutment with the biasing member seat 134, and on a side of the biasing member seat 134 axially opposite the biasing end land portion 138. The end cap 110 is axially stacked with the sleeve 102 within an actuator body 166 (shown in FIG. 4) with the spool piston 106 and the biasing member 108 axially interposed between the end cap 110 and the spool 104. It is contemplated that the end cap 110 compressively retain the biasing member 108 between the end cap 110 and the spool 104, the biasing member 108 thereby urging the spool 104 axially toward the stow solenoid port 128 with a biasing force 46 (shown in FIG. 4).

Figure 4:
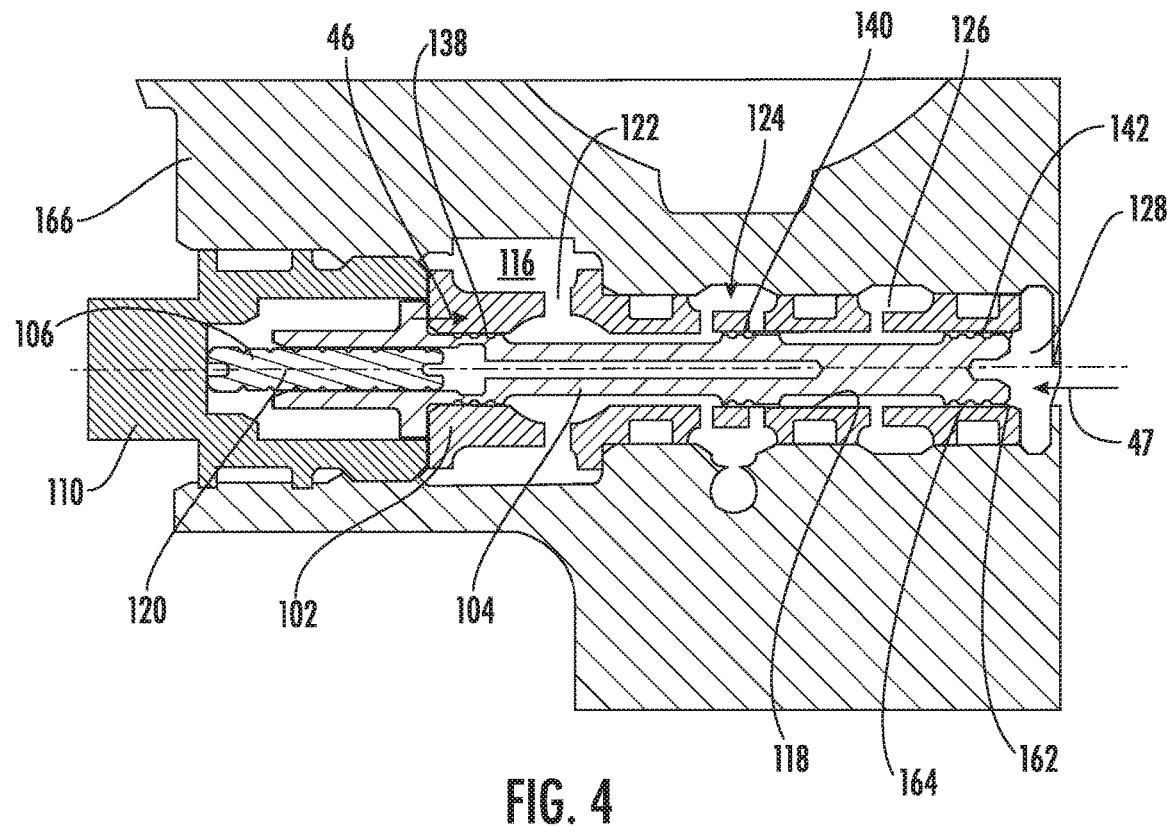
FIG. 4 is a schematic view of the hydraulic control valve of FIG. 1, showing the spool fluidly separating high-pressure fluid and the areas connected to the aircraft return line when the spool is disposed within the sleeve at a first position.
Figure 5:
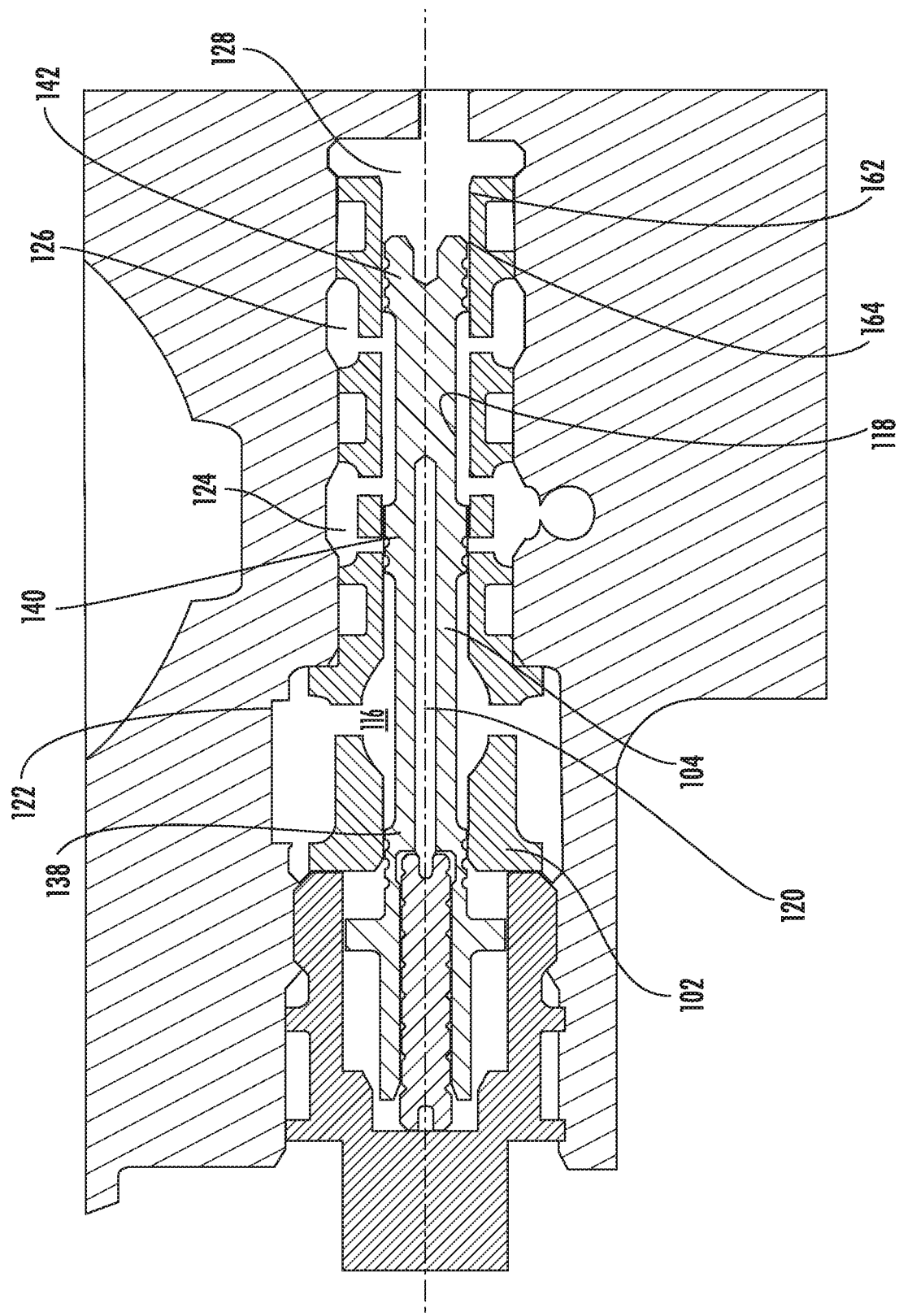
FIG. 5 is a schematic view of the hydraulic control valve of FIG. 1, showing the valve communicating high-pressure fluid from the high-pressure fluid source to the actuator supply port when the spool is disposed at a second position.
Figure 6:
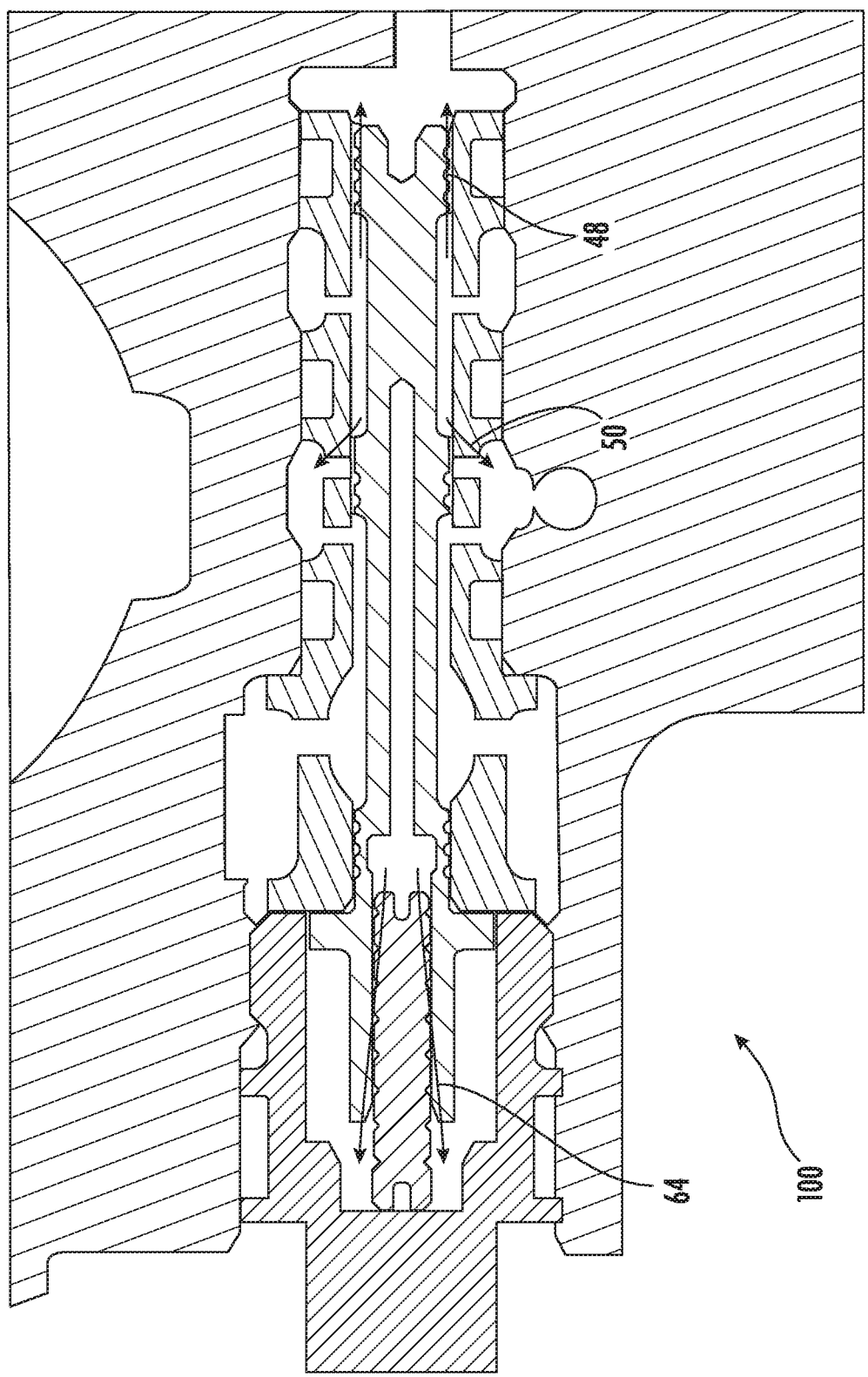
FIG. 6 is a schematic view of the hydraulic control valve of FIG. 1, showing potential leakage paths of high-pressure fluid within the hydraulic control valve when the spool is disposed within the sleeve at the first position.

Referring to FIGS. 4 and 5, the spool 104 is movable within the sleeve 102 between a first position 162 and a second position 164. More specifically, the spool 104 is movable within the bore 116 according to the presence (or absence) of the high-pressure fluid 34 (shown in FIG. 1) at the stow solenoid port 128. Presence (or absence) of the high-pressure fluid 34 is in turn determined by state of the stow solenoid 30 (shown in FIG. 1). Specifically, when the stow solenoid 30 is in the de-energized state 40 (shown in the FIG. 1), the stow solenoid 30 fluidly separates the stow solenoid port 128 from the high-pressure fluid 34, and the spool 104 either remain in or moves to the first position 162 e.g., by translating along the spool movement axis 120 to the right relative to the top of FIG. 4, by operation of the biasing force 46. When the stow solenoid 30 is in the energized state 42 (shown in the FIG. 1), the stow solenoid 30 fluidly couples the stow solenoid port 128 to the high-pressure fluid 34, and the spool 104 moves the second position 164, e.g., by translating along the spool movement axis 120 to the left relative to FIG. 4, by operation of a fluid biasing force 47 originating from the presence of high pressure fluid at the stow solenoid port 128.

As shown in FIG. 4, movement of the spool 104 to the first position 162 fluidly separates the source port 126 from the supply port 124, fluidly separates the source port 126 from the stow solenoid port 128, and further places the supply port 124 in fluid communication with the return port 122. Fluid separation of the source port 126 from the stow solenoid port 128 is accomplished by engagement of the actuated end land portion 142, and more specifically the stow solenoid end portion lands 158 (shown in FIG. 3), against the inner surface 118 of the bore 116. Fluid separation of the source port 126 from the supply port 124 is accomplished by engagement of the intermediate land portion 140, and more specifically the intermediate portion lands 154 (shown in FIG. 3), against the inner surface 118 of the bore 116. Fluid communication between the supply port 124 and the return port 122 is accomplished through the bore 116.

As shown in FIG. 5, movement of the spool 104 to the second position 164 fluidly separates the return port 122 from the supply port 124, fluidly couples the source port 126 to the supply port 124, and further maintains fluid separation of the stow solenoid port 128 and the source port 126. Fluid separation of the source port 126 from the return port 122 and fluid coupling to the supply port 124 is accomplished by engagement of the intermediate land portion 140, and more specifically the intermediate portion lands 154 (shown in FIG. 3), against the inner surface 118 of the bore 116 and on a side of the supply port 124 axially opposite the source port 126. Fluid separation of the source port 126 from the stow solenoid port 128 is accomplished by engagement of the actuated end land portion 142, and more specifically the stow solenoid end portion lands 158 (shown in FIG. 3), against the inner surface 118 of the bore 116. Fluid communication between the source port 126 and the supply port 124 is accomplished through the bore 116.

With continuing reference to FIG. 3, it is contemplated that one of the plurality of stow solenoid end portion lands 158 be longer than another of the plurality of stow solenoid end portion lands 158. In this respect it is contemplated a stow solenoid end portion first land 158A have a stow solenoid end portion first land length 159A, a stow solenoid end portion second land 158B have a stow solenoid end portion second land length 159B, and that the stow solenoid end portion first land length 159A be larger than the stow solenoid end portion second land length 159B. As will be appreciated by those of skill in the art in view of the present disclosure, the elongated length of the stow solenoid end portion first land length 159A relative to the stow solenoid end portion second land length 159B increases contact area with the inner surface 118 of the bore 116. The increased contact area in turn reduces likelihood of internal fluid leakage along a stow solenoid end leakage path 48 (shown in FIG. 6) within the hydraulic control valve 100 when the spool 104 is in a first position 162 with the stow solenoid 30 (shown in FIG. 1) in the de-energized state 40 (shown in FIG. 1).

It is also contemplated that one of the plurality of intermediate portion lands 154 be longer than another of the plurality of intermediate portion lands 154. In this respect it is contemplated an intermediate portion first land 154A have an intermediate portion first land length 155A, an intermediate portion second land 154B have an intermediate portion second land length 155B, and that the intermediate portion first land length 155A be larger than the intermediate portion second land length 155B. As will also be appreciated by those of skill in the art in view of the present disclosure, the elongated length of the intermediate portion first land length 155A relative to the intermediate portion second land length 155B increases contact area between the inner surface 118 of the bore 116. The increased contact area reduces likelihood of internal fluid leakage along an actuator intermediate leakage path 50 (shown in FIG. 6) within the hydraulic control valve 100 when the spool 104 is in a first position 162 with the stow solenoid 30 (shown in FIG. 1) in the de-energized state 40 (shown in FIG. 1).

Figure 7:
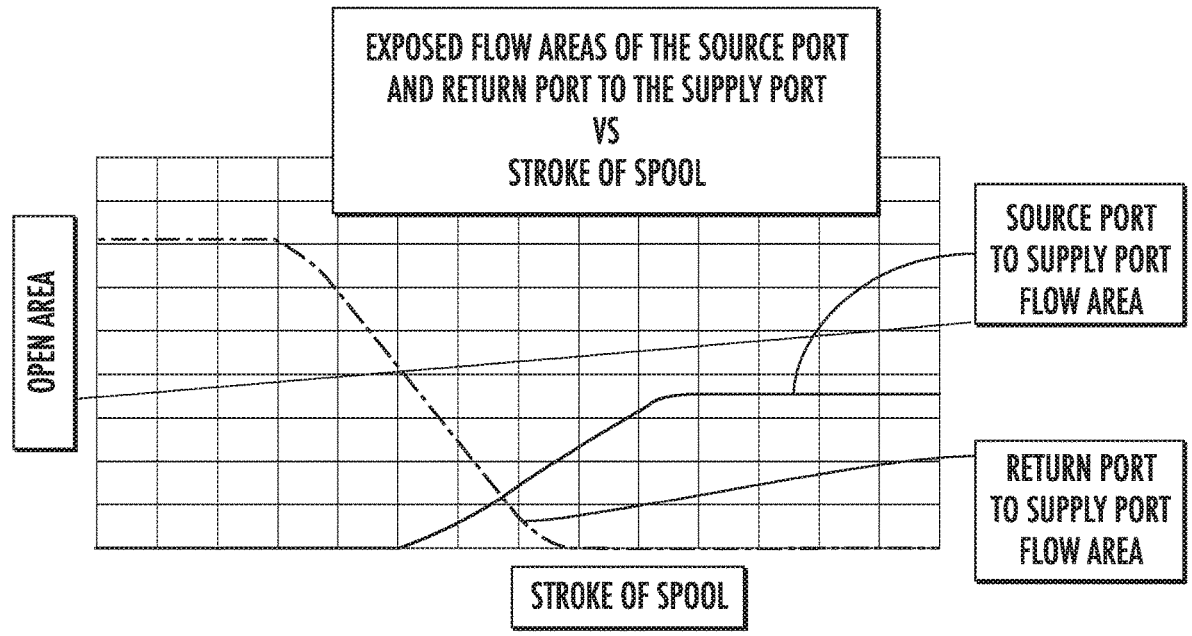
FIGS. 7 and 8 are graphs of effective exposed flow areas of the aircraft return line and high-pressure fluid source to the actuator supply cavity of example spools having symmetrical and elongated lands, showing coincident closure of the aircraft return line with opening of the high-pressure source to the actuator supply cavity in the example having elongated lands.
Figure 8:
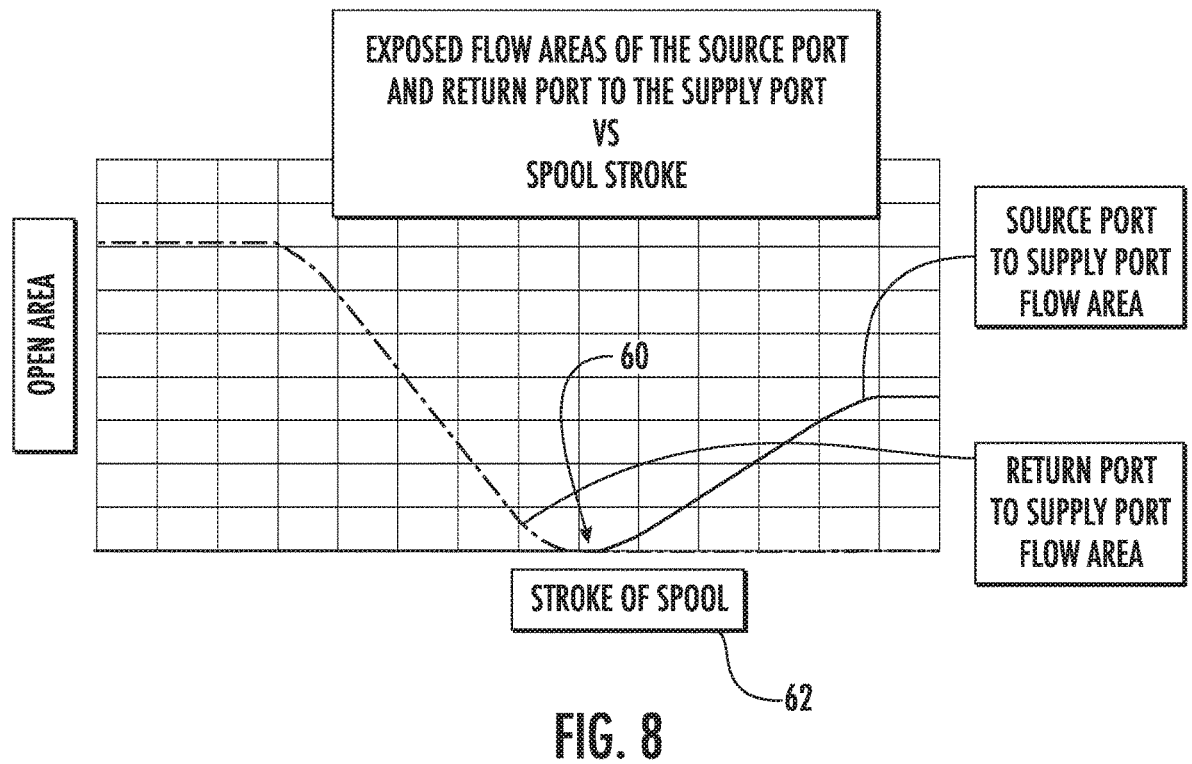

In certain examples the intermediate portion first land 154A is selected to synchronize fluid separation of the return port 122 from the supply port 124 with fluid coupling of the source port 126 with the supply port 124. For example, as shown in FIG. 7, the intermediate portion first land 154A can be positioned along the intermediate land portion 140 such that the return port 122 is not completely fluidly separated (e.g., closed off) from the supply port 124 prior to the source port 126 beginning fluid communication (e.g., opens) with the supply port 124. Alternatively, as shown in FIG. 8, the intermediate portion first land 154A can be positioned along the intermediate land portion 140 such that the return port 122 is completely fluidly separated (e.g., closed off) from the supply port 124 coincidently with the source port 126 beginning fluid communication with the supply port 124. Such examples have a coincident closure position 60 along a stroke 62 of the spool 104 (shown in FIG. 1) between the first position 162 (shown in FIG. 4) and the second position 164 (shown in FIG. 4). This in turn helps prevent the spool from becoming locked between a first position 162 and a second position 164, which in turn would undesirably prevent the actuator 14 from moving the ram air turbine 12 (shown in FIG. 1) from the deployed position 38 (shown in FIG. 1) to the stowed position 36 (shown in FIG. 1).

Hydraulically controlled can be employed to stow ram air turbines subsequent to deployment. Such actuators can employ hydraulic pressure to stow the ram air turbine, such as by porting high-pressure hydraulic fluid resident at the hydraulic control valve while dormant in response to operation of a stow solenoid. Since the ram air turbine can remain dormant for extended periods of time, variation in manufacture of the hydraulic control valve can influence fluid leakage and pressure loss through the hydraulic control valve. For that reason tolerances on features like balancing grooves and lands on spools in hydraulic control valves are typically carefully controlled, adding expense to the manufacturing process.

In examples described herein spools for hydraulic control valves have sealing lands with uneven land axial lengths. The elongated length of the sealing land increases the total axial length of sealing land portion having the elongated sealing land, increasing resistance to fluid leakage across the land portion and limiting fluid leakage across the land portion. In certain examples on land portions on both axial sides of the source port include elongated lands to limit leakage from the source port during intervals that the ram air turbine is dormant.

In accordance with certain examples the axial position of the elongated land along each of the land portions is selected to limit leakage through the hydraulic control valve. In this respect the elongated intermediate land is positioned between the axially shorter intermediate land and the source port to allow the axially shorter intermediate land to fully close the return port prior to high-pressure fluid from the source port entering the supply port as the spool moves from the first position to the second position with the sleeve. Closure of the return port by the intermediate land portion, and more particularly by the axially shorter intermediate land, prevents the high-pressure fluid entering the supply port from exiting the hydraulic control valve through the return port during spool actuation, in turn preventing the undesirable spool pressure lock scenario which would fail to stow the ram air turbine. Preventing this undesired flow during movement from the first position limits (or eliminates entirely) probability that the spool fails to reach the second position subsequent to departing the first position.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydraulic control valve, comprising:
   a sleeve with a stow solenoid end and a biasing member end, the sleeve defining a bore extending along a spool movement axis, a source port proximate the stow solenoid end of the sleeve and in communication with the bore, and a supply port between the source port and the biasing end of the sleeve; and
   a spool with a first land and second land slidably disposed within the bore and movable along the spool movement axis between a first position and a second position, the spool fluidly separating the source port from the supply port in the first position, the bore fluidly coupling the source port with the supply port in the second position, wherein the first land extends circumferentially about the spool and has a first land length, the second land extending circumferentially about the spool and has a second land length, the first land length larger than the second land length;
   wherein the spool has an intermediate land portion axially separating an actuated end land portion from a biasing end land portion, the intermediate land portion of the spool defining a plurality of intermediate balancing grooves, wherein the first land and the second land are arranged on the intermediate land portion of the spool and at least one of the plurality of intermediate balancing grooves axially separates the first land from the second land.

2. The hydraulic control valve of claim 1, wherein the spool has an actuated end land portion axially separated from an intermediate land portion and a biasing end land portion, wherein the first land and the second land are arranged on the actuated end land portion of the spool.

3. The hydraulic control valve of claim 2, wherein the first land axially separates the second land from the stow solenoid end of the sleeve.

4. The hydraulic control valve of claim 2, wherein the actuated end land portion defines a plurality of stow solenoid end balancing grooves, wherein the plurality of stow solenoid end balancing grooves axially separates the first land from the second land.

5. The hydraulic control valve of claim 2, wherein the first land and the second land fluidly separate the stow solenoid end of the sleeve from the source port in the first position, wherein the first land and the second land fluidly separate the stow solenoid end of the sleeve from the supply port in the first position and the second position.

6. The hydraulic control valve of claim 2, wherein the actuated end land portion defines a plurality of stow solenoid end balancing grooves, wherein the intermediate land portion defines a plurality of intermediate balancing grooves, wherein the plurality of intermediate balancing grooves is smaller than the plurality of stow solenoid end balancing grooves.

7. The hydraulic control valve of claim 1, wherein the first land is arranged axially between the second land and the stow solenoid end of the sleeve.

8. The hydraulic control valve of claim 1, wherein the sleeve defines radially therethrough a return port in fluid communication with the bore, wherein the first land fluidly separates the return port from the source port in the first position, wherein the second land fluidly separates the return port from the source port in the second position.

9. The hydraulic control valve of claim 1, wherein the intermediate land portion defines a plurality of intermediate balancing grooves, wherein the actuated end land portion defines a plurality of stow solenoid end balancing grooves, wherein the plurality of intermediate balancing grooves is smaller than the plurality of stow solenoid end balancing grooves.

10. The hydraulic control valve of claim 1, wherein the spool has a biasing member seat arranged axially between the second land and the biasing member end of the spool, further comprising a biasing member arranged between the biasing member seat and the biasing member end of the sleeve.

11. The hydraulic control valve of claim 1, wherein the sleeve defines a stow solenoid port on the actuated end of the sleeve, the stow solenoid port in fluid communication with the first land in the first position, the stow solenoid port in fluid communication with the first land in the second position of the spool.

12. The hydraulic control valve of claim 1, wherein the sleeve defines a return port extending radially through the sleeve, wherein the supply port is fluidly separated from the source port and fluidly separated from the return port at a coincident closure position along a stroke of the spool between the first position and the second position.

13. The hydraulic control valve of claim 1, further comprising:
    a source orifice body fluidly coupled to the source port;
    a source union fluidly coupled to the source orifice body; and
    a source fitting fluidly coupled to the source union and arranged to communicate high-pressure fluid from a high-pressure fluid source to the source union.

14. The hydraulic control valve of claim 13, wherein the sleeve defines a stow solenoid port axially separated from the supply port by the source port, the hydraulic control valve further comprising:
    a stow solenoid fluidly coupled to the source union; and
    a return union fluidly coupled to the stow solenoid and the sleeve.

15. The hydraulic control valve of claim 13, further comprising:
    a pressure switch fluidly coupled to the supply port of the sleeve; and
    an actuator for a ram air turbine operatively associated with the pressure switch via position of the spool within the hydraulic control valve.

16. A stow actuator arrangement for ram air turbine, comprising:
    a hydraulic control valve as recited in claim 1, wherein the spool has an intermediate land portion axially separating a biasing end land portion from an actuated end land portion, wherein the first land is a stow solenoid end portion first land, wherein the second land is a stow solenoid end portion second land; and
    wherein the intermediate land portion has an intermediate portion first land and an intermediate portion second land, wherein the intermediate portion first land has an intermediate portion first land length, wherein the intermediate portion second land has an intermediate portion second land length, and wherein the intermediate portion first land length is larger than the intermediate portion second land length.

17. The stow actuator arrangement of claim 16, wherein the stow solenoid end portion first land is axially separated from the intermediate portion first land by the stow solenoid end portion second land.

18. The stow actuator arrangement of claim 16, further comprising:
    a high-pressure fluid source fluidly coupled to the source port of the sleeve;

a ram air turbine operatively associated with a pressure switch via position of the spool within the hydraulic control valve, the pressure switch fluidly coupled to the supply port of the sleeve, the ram air turbine having a stowed position and a deployed position; and a stow solenoid fluidly coupled to the source port of the sleeve and operative to move the ram air turbine from the deployed position to the stowed position.

19. A hydraulic control valve, comprising:

a sleeve with a stow solenoid end and a biasing member end, the sleeve defining a bore extending along a spool movement axis, a source port proximate the stow solenoid end of the sleeve and in communication with the bore, and a supply port between the source port and the biasing end of the sleeve; and a spool with a first land and second land slidably disposed within the bore and movable along the spool movement axis between a first position and a second position, the spool fluidly separating the source port from the supply port in the first position, the bore fluidly coupling the source port with the supply port in the second position, wherein the first land extends circumferentially about the spool and has a first land length, the second land extending circumferentially about the spool and has a second land length, the first land length larger than the second land length;

wherein the spool has a biasing member seat arranged axially between the second land and the biasing member end of the spool, and a biasing member is arranged between the biasing member seat and the biasing member end of the sleeve.

20. A hydraulic control valve, comprising:

a sleeve with a stow solenoid end and a biasing member end, the sleeve defining a bore extending along a spool movement axis, a source port proximate the stow solenoid end of the sleeve and in communication with the bore, and a supply port between the source port and the biasing end of the sleeve; and a spool with a first land and second land slidably disposed within the bore and movable along the spool movement axis between a first position and a second position, the spool fluidly separating the source port from the supply port in the first position, the bore fluidly coupling the source port with the supply port in the second position, wherein the first land extends circumferentially about the spool and has a first land length, the second land extending circumferentially about the spool and has a second land length, the first land length larger than the second land length wherein the spool has an intermediate land portion axially separating an actuated end land portion from a biasing end land portion, wherein the first land and the second land are arranged on the intermediate land portion of the spool, the first land being arranged axially between the second land and the stow solenoid end of the sleeve.

* * * * *